United States Patent
Ui et al.

(10) Patent No.: US 7,855,250 B2
(45) Date of Patent: Dec. 21, 2010

(54) FILLING FOAM COMPOSITION, FOAM FILLING MEMBER, AND FILLING FOAM

(75) Inventors: Takehiro Ui, Osaka (JP); Takashi Koizumi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 191 days.

(21) Appl. No.: 12/081,755

(22) Filed: Apr. 21, 2008

(65) Prior Publication Data

US 2008/0269364 A1 Oct. 30, 2008

(30) Foreign Application Priority Data

Apr. 24, 2007 (JP) ............................. 2007-114556

(51) Int. Cl.
*C08F 8/04* (2006.01)
*C08F 236/10* (2006.01)

(52) U.S. Cl. ...................... 525/88; 525/331.9; 525/242; 525/332.9; 525/332.5; 524/571; 524/575; 524/68

(58) Field of Classification Search .................... 525/88, 525/331.9, 242, 332.9, 332.5; 524/571, 575, 524/68

See application file for complete search history.

(56) References Cited

U.S. PATENT DOCUMENTS

| 3,920,591 A | 11/1975 | Jacobs et al. |
| 4,255,371 A | 3/1981 | Shimoyashiki et al. |
| 4,525,487 A | 6/1985 | Ahnemiller |
| 2006/0252860 A1 | 11/2006 | Ui et al. |

FOREIGN PATENT DOCUMENTS

| EP | 1661941 | 5/2006 |
| EP | 1849825 | 10/2007 |
| JP | 2005-097586 | 4/2005 |
| JP | 2005-97586 | 4/2005 |

*Primary Examiner*—Robert D. Harlan
(74) *Attorney, Agent, or Firm*—Jean C. Edwards, Esq.; Akerman Senterfitt LLP

(57) ABSTRACT

A filling foam composition contains a polymer, 4,4'-oxybis (benzenesulfonylhydrazide), an amine compound (except urea compound) having a melting point of 40° C. or more, and an organic peroxide, and the amine compound is mixed in an amount of 5 parts by weight or more per 100 parts by weight of the 4,4'-oxybis(benzenesulfonylhydrazide).

9 Claims, 1 Drawing Sheet

(a)

(b)

FILLING FOAM COMPOSITION, FOAM FILLING MEMBER, AND FILLING FOAM

CROSS REFERENCE TO RELATED APPLICATION

The present application claims priority from Japanese Patent Application No. 2007-114556 filed on Apr. 24, 2007, the content of which is hereby incorporated by reference in its entirety.

BACKGROUND OF THE INVENTION

1. Field of the Invention

The present invention relates to filling foam used for filling an empty space between various members and an interior space of hollow members, and a foam filling member and a filling foam composition used for forming the filling foam.

2. Description of Related Art

It has been conventionally known to fill foam as a filler in a hollow member formed as a closed cross section of an automotive pillar or the like for the purpose of preventing the vibration and noise of an engine or wind noise from being transmitted into the vehicle interior.

There has been proposed that, for example, a filling foam composition which is made of ethylene-vinyl acetate copolymer, 4,4'-oxybis(benzenesulfonylhydrazide), dicumyl peroxide, and dicyclohexylamine (melting point of −0.1° C.) is prepared, and the composition thus prepared is heated at 160° C. for 20 minutes to foam (cf. (Comparative Example 5 of Table 2 in) Japanese Unexamined Patent Publication No. 2005-97586).

SUMMARY OF THE INVENTION

Usually, heat in the drying line process during automotive baking finish is used for foaming filling foam composition. Depending on the arrangement of the filling foam composition, however, the filling foam composition may not be heated to the temperature described above. In such case, the filling foam composition of Japanese Unexamined Patent Publication No. 2005-97586 disadvantageously fails to obtain a sufficient foaming ratio, so that the interior space of the hollow member cannot be filled without leaving any space.

Further, in the case where the filling foam composition of Japanese Unexamined Patent Publication No. 2005-97586 is stored over a long period of time after preparation, and the stored filling foam composition is then foamed, excellent storage stability cannot be ensured, resulting in a poor foaming ratio.

An object of the present invention is to provide a filling foam composition capable of being sufficiently foamed by heating at low temperature while ensuring good storage stability, a foam filling member using the filling foam composition, and a filling foam obtained by foaming the filling foam composition.

The filling foam composition of the present invention comprises a polymer, 4,4'-oxybis(benzenesulfonylhydrazide), an amine compound (except urea compound) having a melting point of 40° C. or more, and an organic peroxide, wherein the amine compound is mixed in an amount of 5 parts by weight or more per 100 parts by weight of the 4,4'-oxybis(benzenesulfonylhydrazide).

Further, in the filling foam composition of the present invention, it is preferable that the amine compound comprises dicyandiamides and/or dicyclohexylamine salts.

Still further, the foam filling member of the present invention comprises the above-mentioned filling foam composition, and a mounting member mounted to the filling foam composition, and attachable in an interior space of a hollow member.

Yet further, the filling foam of the present invention is obtained by foaming the above-mentioned filling foam composition.

The filling foam composition of the present invention can be sufficiently foamed by heating at low temperature. Furthermore, the filling foam composition of the present invention can ensure good storage stability at high temperature and high humidity, so that even after subjected to high-temperature and high-humidity storage for a long time, the filling foam composition can prevent the foaming ratio from lowering.

Thus, the filling foam composition and the foam filling member of the present invention can fill a hollow member with a filling foam with less reduction of the foaming ratio without leaving any space.

DETAILED DESCRIPTION OF PREFERRED EMBODIMENTS

Figure 1:
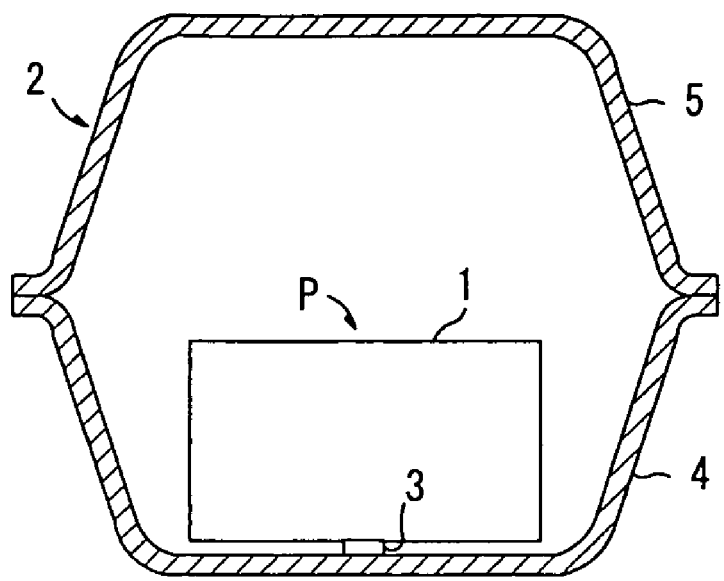
FIG. 1 is a process drawing showing an embodiment of a method for filling an interior space of a pillar of a vehicle using a filling foam composition, a foam filling member, and a filling foam of the present invention, (a) showing a process of mounting a mounting member to the filling foam composition to produce the foam filling member, and placing the foam filling member in the pillar, and (b) showing a process of foaming, crosslinking, and curing the filling foam composition by heating, thereby filling the interior space of the pillar with the resulting filling foam.
Figure 1:
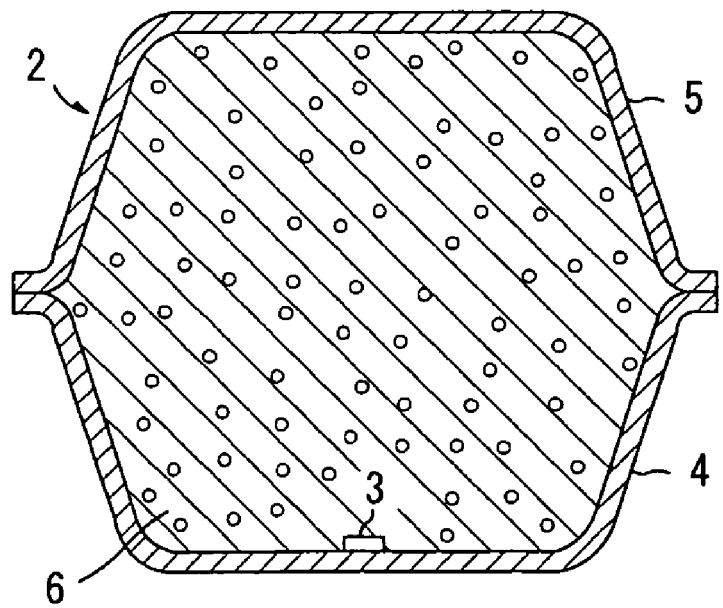

The filling foam composition of the present invention contains a polymer, 4,4'-oxybis(benzenesulfonylhydrazide), an amine compound, and an organic peroxide.

In the present invention, the polymer is not particularly limited, and a known polymer is used. The polymer that may be used include, for example, resins such as ethylene-vinyl acetate copolymer (EVA), olefin resin (e.g., polyethylene, polypropylene, etc.), polyester, polyvinyl butyral, polyvinyl chloride, polyamide, and polyketone, and rubber such as styrene-butadiene rubber (SBR), polybutadiene rubber (BR), and ethylenepropylenediene rubber (EPDM). Preferably, EVA is used as the polymer. The use of EVA allows to increase the foaming ratio. These polymers can be used alone, or two or more kinds of polymers can be appropriately selected and used.

4,4'-oxybis(benzenesulfonylhydrazide) (abbreviated to OBSH) serves as a foaming agent for foaming the polymer. The use of OBSH results in good fling and good adhesion of the filling foam to the hollow member after foaming.

The mixing ratio of OBSH is not particularly limited, and OBSH is mixed in the range of, for example, 5 to 30 parts by weight, or preferably 10 to 25 parts by weight per 100 parts by weight of the polymer. When the mixing ratio of OBSH is less than this range, the filling foam composition requires a larger shape to fill an interior space of the hollow member, so that workability of mounting work or the like may be impaired. Conversely, when the mixing amount of OBSH is higher than this range, the foaming ratio corresponding to the mixing ratio cannot be obtained, which may cause disadvantage in cost.

In the present invention, the amine compound is an organic compound (foaming accelerator), except urea compound, containing a primary amino group (—NH$_2$) or a secondary amino group (>NH) having a melting point of 40° C. or more, and is mixed in order to reduce the decomposition temperature of OBSH.

Examples of the organic compound containing a primary amino group include dicyandiamides, and more specifically, a dicyandiamide.

Examples of the organic compound containing a secondary amino group include dicyclohexylamine salts.

Dicyclohexylamine salts are compounds formed of, for example, dicyclohexylamine (base component) and an acid component. Examples of the acid component include alcohol such as, for example, monohydric alcohol such as ethanol, or polyhydric alcohol such as ethylene glycol, inorganic acid such as, for example, hydrochloric acid, nitric acid, hydrobromic acid (HBr), hydroiodic acid (I), or sulfuric acid, and organic acid such as, for example, acetic acid. Of these acid components, preferably alcohol, more preferably polyhydric alcohol, or even more preferably ethylene glycol is used.

Of these amine compounds, dicyandiamide, or a dicyclohexylamine salt of ethylene glycol is preferably used.

A generally commercially available amine compound can be used, and for example, DICYANEX 325 (dicyandiamide, available from Air Products & Chemicals, Inc.) or NOCMASTER EGS (a mixture of a dicyclohexylamine salt of ethylene glycol (80%) and a long-chain alkyl alcohol (20%), available from OUCHI SHINKO CHEMICAL INDUSTRIAL CO., LTD.) is used.

These amine compounds can be used alone, or two or more kinds of amine compounds can be appropriately selected and used.

The melting point of the amine compound is 40° C. or more, preferably 50° C. or more, or even more preferably 60° C. or more, and usually 250° C. or less.

In the case where the melting point of the amine compound is less than 40° C., the amine compound is evaporated (volatilized) during preparation of a kneaded composition (mixture), so that the decomposition temperature of OBSH cannot be reduced during foaming by heating, thereby failing to obtain a high foaming ratio.

The amine compound is mixed in the range of 5 parts by weight or more, or preferably 10 parts by weight or more, and for example, 200 parts by weight or less, preferably 180 parts by weight or less, or more preferably 130 parts by weight or less per 100 parts by weight of OBSH.

When the amine compound is mixed in an amount of less than 5 parts by weight, the decomposition temperature of OBSH cannot be reduced, thereby failing to obtain a high foaming ratio.

Conversely, when the amine compound is mixed in an amount of more than 200 parts by weight, an excess of the amine compound is mixed. Therefore, the decomposition temperature of OBSH cannot be reduced to the predetermined temperature (e.g., 130° C.) or less, which may cause disadvantage in cost. Still, in the case of exceeding 200 parts by weight, an odor may be generated. Further, such case may lower the foaming ratio.

In the present invention, a urea compound is not contained in the amine compound. If any urea compound is contained therein, the filling foam composition has poor storage stability, thereby obtaining a lower foaming ratio after a long-term storage. Examples of such urea compound include urea or a derivative of urea.

In the present invention, the organic peroxide serves as a crosslinking agent for crosslinking a polymer, and, for example, as a radical generator capable of crosslinking a polymer by decomposing the organic peroxide by heating to generate a free radical. The organic peroxide that may be used include, for example, dicumyl peroxide (DCP), 1,1-ditertiarybutylperoxy-3,3,5-trimethylcyclohexane, 2,5-dimethyl-2,5-ditertiarybutylperoxyhexane, 1,3-bis(tertiarybutylperoxyisopropyl)benzene, tertiarybutylperoxyketone, and tertiarybutylperoxy benzoate. Preferably, DCP is used.

These organic peroxides can be used alone, or two or more kinds of organic peroxides can be appropriately selected and used.

The mixing ratio of the organic peroxide is not particularly limited, and the organic peroxide is mixed in the range of, for example, 0.1 to 10 parts by weight, or preferably 1 to 7 parts by weight per 100 parts by weight of the polymer. When the mixing ratio of the organic peroxide is less than this range, the viscosity is poorly increased by crosslinking, and thus gas pressure during foaming may break foams. Conversely, when the mixing ratio of the organic peroxide is more than this range, excessive crosslinking occurs, so that the polymer coating suppresses the gas pressure during foaming to cause poor whereby foaming with a high foaming ratio.

In the present invention, known additives, such as, for example, a filler, a cross-linking accelerator, a processing auxiliary agent, a stabilizer, a plasticizer, an antiaging agent, an antioxidant, a pigment, a coloring agent, a mildewproofing agent, and a fire retardant, can be appropriately added to the filling foam composition.

The filling foam composition of the present invention can be prepared as a kneaded composition by mixing each of the above-mentioned components with the mixing ratio described above, and kneading the mixture by, for example, a mixing roll, a pressure kneader, or an extruder, under temperature conditions where OBSH is less decomposed (e.g., 80 to 110° C.).

In the preparation, it is preferable that the resulting kneaded composition is prepared so as to have a flow tester viscosity (120° C., load of 40 kg) in the range of $0.5 \times 10^4$ to $1.5 \times 10^4$ Pa·s, or further $0.8 \times 10^4$ to $1.2 \times 10^4$ Pa·s. The kneaded composition can be foamed with a proper volume expansion ratio (described later) by setting the viscosity of the kneaded composition in such range.

Furthermore, in the present preparation, the resulting kneaded composition can be prepared as a preform by molding the composition into a predetermined shape.

The molding method of the kneaded composition is not particularly limited, and, for example, the kneaded composition may be pelletized using a pelletizer, and molding the resulting pellets into a predetermined shape under the temperature conditions where OBSH is less decomposed using an injection molding machine or an extruder, or may be directly molded into a predetermined shape by calendering or press molding.

The filling foam of the present invention can be formed by foaming, crosslinking, and curing through heating the resulting filling foam composition of the present invention under appropriate conditions.

The resulting filling foam of the present invention has a density (weight of foam (g)/volume of foam (cm$^3$)) of, for example, 0.05 to 0.2 g/cm$^3$, or preferably 0.07 to 0.11 g/cm$^3$, and an foaming ratio (volume expansion ratio) upon foaming of, for example, 8 times or more, or preferably 9 to 15 times. When the foaming ratio attains to the above range, an interior space of a hollow member can be filled with the filling foam without leaving any space even if the internal space of the hollow member has a complicated shape.

After subjected to high-temperature and high-humidity storage for a long time as described later, the resulting filling foam of the present invention has a foaming ratio of, for example, 65% or more, or preferably 80 to 110% as compared with the foaming ratio immediately after the preparation.

Thus, the resulting filling foam of the present invention gives various effects such as reinforcement, vibration suppression, sound insulation, dust control, heat insulation, buffering, and water tight for various members, and it can be preferably used as a filling material for various industrial products such as reinforcing materials, vibration proof materials, sound insulation materials, dust control materials, heat insulators, buffers, and water proof materials, which are filled in a gap between various members or an interior space of a hollow member.

The method for filling a gap between various members or an interior space of a hollow member is not particularly limited, and, for example, the following method may be used, such as, a filling foam composition is placed between members for filling a gap, or in an interior space of a hollow member, the placed filling foam composition is then heated to be foamed, crosslinked, and cured, so that a filling foam is formed. With this filling foam, the gap between members or the interior space of the hollow member may be filled.

More specifically, for example, when an interior space of a hollow member is filled, a mounting member is mounted to a filling foam composition to produce a foam filling member first, and the mounting member of the foam filling member is mounted in the interior space of the hollow member. Thereafter, the foam filling member is foamed by heating to form a filling foam, so that the interior space of the hollow member can be filled with the filling foam.

Examples of such hollow member can include a pillar of a vehicle. With the filling foam composition of the present invention, a foam filling member is produced and is then mounted in an interior space of a pillar. Thereafter, the foam filling member thus mounted is foamed to form a filling foam, which can effectively prevent vibration and noise of an engine or wind noise from being transmitted into the vehicle interior of an automobile while providing sufficient reinforcement of the pillar.

Next, as an example of the embodiment of the filling foam composition, the foam filling member, and the filling foam of the present invention, a method for filling an interior space of a pillar of a vehicle will be described below.

In this method, first, as shown in FIG. 1(a), a filling foam composition 1 molded into a predetermined shape is placed in a pillar 2. In order to place the filling foam composition 1 in the pillar 2, for example, a mounting member 3 is attached to the filling foam composition 1 to produce a foam filling member P, and the mounting member 3 of the foam filling member P is attached to the inner surface of the pillar 2. In order to attach the mounting member 3 to the filling foam composition 1, for example, the mounting member 3 is insert-molded together with a kneaded composition during the molding of the filling foam composition 1, other than the method to attach the mounting member 3 to the molded filling foam composition 1. In addition, in order to attach the mounting member 3 to the inner surface of the pillar 2, for example, the mounting member 3 is locked by forming a locking groove in the inner surface of the pillar 2, and then inserting the mounting member 3 therein, or fixed by adsorption or magnetic force by constituting the mounting member 3 with a suction cup or a magnet. As a further alternative, the mounting member 3 is attached by welding by constituting the mounting member 3 with a metal plate.

The pillar 2 is composed of an inner panel 4 and an outer panel 5 both having a generally concave shape in cross section. First, the filling foam composition 1 is placed on the inner panel 4, and both end portions of the inner panel 4 and the outer panel 5 are then abutted against each other in opposed relation. These abutted panels are connected by welding to form a closed cross section. More specifically, such pillar 2 is used as a front pillar, a side pillar, or a rear pillar of a vehicle body.

Thereafter, in this method, using the heat in the drying line process during subsequent baking finish, the pillar 2 is usually heated at a temperature of, for example, 160° C. or more, or preferably 180° C. or more. Depending on the portion of the pillar 2 on which the foam filling member P is placed, however, the foam filling member P may not be heated to the above-mentioned temperature, so that the pillar 2 may be heated only to a temperature of, for example, less than 140° C., or preferably less than 160° C. (e.g., 130 to 150° C.).

Such heating, however, allows formation of a filling foam 6 by foaming, crosslinking, and curing the filling foam composition 1, and the interior space of the pillar 2 can be filled with the filling foam 6 without leaving any space.

The shape, placement position, disposition orientation, number of disposition and the like of the filling foam composition 1 are appropriately selected according to the shape of the pillar 2.

The filling foam composition 1 contains OBSH and an amine compound (except urea compound) having a melting point of 40° C. or more, and the amine compound is mixed in an amount of 5 parts by weight or more per 100 parts by weight of OBSH, so that the filling foam composition 1 can be sufficiently foamed by heating at low temperature.

After the filling foam composition 1 is prepared, or the foam filling member P is prepared using the filling foam composition 1, the prepared product may be subjected to long-term storage before used (filled) by a user. The filling foam composition 1 can ensure good storage stability at high temperature and high humidity after the preparation. Thus, even after subjected to high-temperature and high-humidity storage for a long time, the filling foam composition 1 can prevent the foaming ratio from lowering, whereby a user can fill the interior space of the pillar 2 with the filling foam 6 without leaving any space.

EXAMPLES

While in the following, the present invention will be described in further detail with reference to Examples and Comparative Examples, the present invention is not limited to any of them.

Preparation of Filling Foam Composition

According to the blending formulation shown in Table 1, filling foam compositions of Examples 1 to 3 and Comparative Examples 1 to 4 were prepared by kneading components of a polymer, a foaming agent (OBSH), a foaming accelerator (amine compound), and a crosslinking agent (organic peroxide) at a temperature of 110° C. and a rotation speed of 15 $min^{-1}$ for 10 minutes using a 6-inch mixing roll. Subsequently, the kneaded mixture was press-molded with a hot press at 90° C. to form into a 3 mm-thick sheet. Thereafter, the sheet was cut out into a size of 30 mm×30 mm to obtain a test piece.

Evaluation of Filling Foam Composition (1) Foaming Ratio Immediately After Preparation The test piece thus obtained was heated at 130° C. for 20 minutes to be foamed, and the volume expansion ratio of the foamed test piece was determined. The results are shown in Table 1.

(2) Foaming Ratio After Long-Term Storage at High Temperature/Humidity

The test piece thus obtained was stored at 40° C. and 92% RH for 20 days. Thereafter, the test piece thus stored was foamed by heating at 130° C. for minutes, and the volume expansion ratio of the foamed test piece was determined. The results are shown in Table 1.

TABLE 1

| Example/Comparative Example | | Melting Point (° C.) | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|---|
| Blending Formulation of Filling Foam Composition | | | | | | | | | |
| Polymer | EVA*1 | — | 100 | 100 | 100 | 100 | 100 | 100 | 100 |
| Foaming Agent | OBSH*2 | | 25 | 25 | 25 | 25 | 25 | 25 | 25 |
| Foaming Accelerator | Dicyandiamide*3 | 207-212 | 5 | — | — | — | — | — | — |
| (Amine Compound) | Dicyclohexylamine salt*4 | 60 or more | — | 5 | 35 | — | — | 0.5 | — |
| | Dicyclohexylamine | −0.1 | — | — | — | — | 5 | — | — |
| | Di-n-butylamine | −62 | — | — | — | 5 | — | — | — |
| | CELLPASTE K5*5 (Urea Compound) | 135 | — | — | — | — | — | — | 5 |
| Crosslinking Agent (Organic Peroxide) | DCP*6 | — | 5 | 5 | 5 | 5 | 5 | 5 | 5 |
| Evaluation | | | | | | | | | |
| Volume Expansion Ratio | Immediately After Preparation | | 10.2 | 9.6 | 8.4 | 1.8 | 5.1 | 2.5 | 12.4 |
| | After 20-Day Storage (40° C. x 92% RH) from the Preparation | | 9.5 | 8.3 | 7.8 | 1.7 | 4.6 | 2.3 | 4.6 |

*1EVA: Ethylene-vinyl acetate copolymer (Avaialble from DU PONT-MITSUI POLYCHEMICALS CO., LTD. under the trade name of EVAFLEX EV460, MFR 2.5, contains 19% by weight of vinyl acetate)
*2OBSH: 4,4'-oxybis(benzenesulfonylhydrazide) (Avaialble from EIWA CHEMICAL IND. CO., LTD. under the trade name of NEOTHLENE HM80NP, contains 80% by weight of OBSH and 20% by weight of EPDM)
*3Dicyandiamide: DICYANEX 325 (Avaialble from Air Products & Chemicals, Inc.)
*4Dicyclohexylamine salt: NOCMASTER EGS (Avaialble from OUCHI SHINKO CHEMICAL INDUSTRIAL CO., LTD., mixture of a dicyclohexylamine salt of ethylene glycol (80%) and a long-chain alkyl alcohol (20%))
*5CELLPASTE K5: Urea compound (Avaialble from EIWA CHEMICAL IND. CO., LTD., urea as main component)
*6DCP: Dicumyl peroxide (Avaialble from NOF Corporation under the trade name of PERCUMYL D-40MBK, contains 40% by weight of dicumyl peroxide, and 60% by weight of silica + EPDM, at 1-minute half-life temperature of 175° C.)

Numerical values in the columns of the blending formulation of the filing foam composition in Table 1 show the number of parts by weight of each component to be mixed. The volume expansion ratios in Table 1 are calculated using the equation, volume expansion ratio=density before foaming/density after foaming.

Table 1 shows that in Examples 1 to 3 in which an amine compound (except urea compound) having a melting point of 40° C. or more is mixed in an amount of 5 parts by weight per 100 parts by weight of OBSH, the filling foam composition can ensure a high volume expansion ratio even under heating at 130° C., and furthermore, even after subjected to high-temperature and high-humidity storage for a long time, the filling foam composition can prevent the volume expansion ratio from lowering.

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. A filling foam composition comprising a polymer, 4,4'-oxybis(benzenesulfonylhydrazide), an amine compound having a melting point of 40° C. or more, and an organic peroxide,
   wherein the amine compound is mixed in an amount of 5 parts by weight or more per 100 parts by weight of the 4,4'-oxybis(benzenesulfonylhydrazide).

2. The filling foam composition according to claim 1, wherein the amine compound comprises dicyandiamides and/or dicyclohexylamine salts.

3. The filling foam composition according to claim 1, wherein the polymer is an ethylene-vinyl acetate copolymer.

4. The filling foam composition according to claim 1, wherein the organic peroxide is dicumyl peroxide.

5. The filling foam composition according to claim 1, wherein the 4,4'-oxybis(benzenesulfonylhydrazide) is mixed in a range of 5 to 30 parts by weight per 100 parts by weight of the polymer.

6. The filling foam composition according to claim 1, wherein the amine compound is mixed in an amount of 200 parts by weight or less per 100 parts by weight of the 4,4'-oxybis(benzenesulfonylhydrazide).

7. The filling foam composition according to claim 1, wherein the organic peroxide is mixed in a range of 0.1 to 10 parts by weight per 100 parts by weight of the polymer.

8. A foam filling member comprising a filling foam composition, and a mounting member mounted to the filling foam composition, and attachable in an interior space of a hollow member,
   wherein the filling foam composition comprises a polymer, 4,4'-oxybis(benzenesulfonylhydrazide), an amine compound having a melting point of 40° C. or more, and an organic peroxide, and the amine compound is mixed in an amount of 5 parts by weight or more per 100 parts by weight of the 4,4'-oxybis(benzenesulfonylhydrazide).

9. A filling foam obtained by foaming a filling foam composition,
wherein the filling foam composition comprises a polymer, 4,4'-oxybis(benzenesulfonylhydrazide), an amine compound having a melting point of 40° C. or more, and an organic peroxide, and the amine compound is mixed in an amount of 5 parts by weight or more per 100 parts by weight of the 4,4'-oxybis(benzenesulfonylhydrazide).

* * * * *